March 26, 1946.  C. J. RASMUSSEN  2,397,290
SCREW FITTING
Filed Aug. 24, 1943
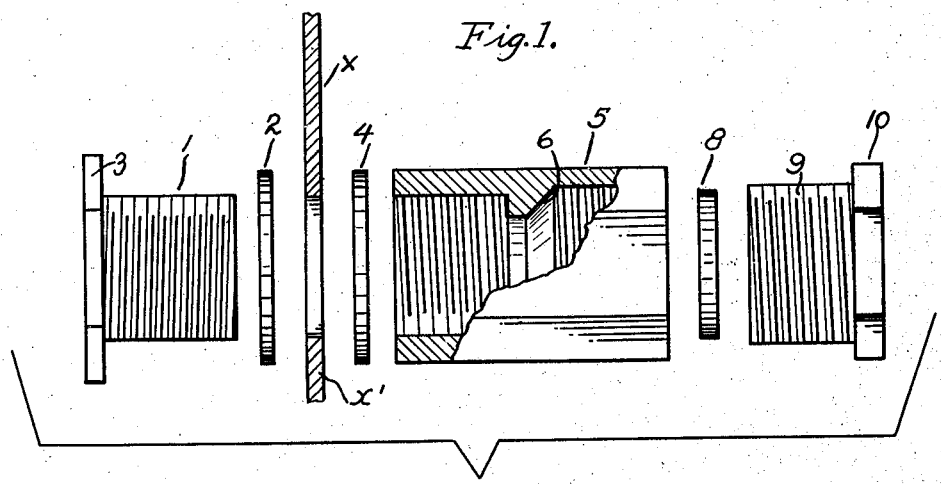
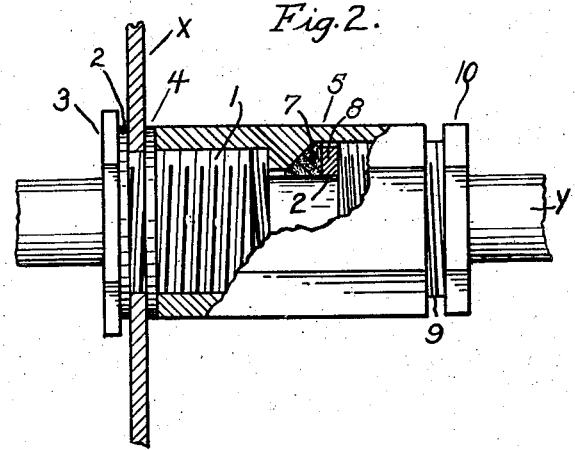
INVENTOR.
BY Carl J. Rasmussen Patented Mar. 26, 1946

2,397,290

UNITED STATES PATENT OFFICE 2,397,290

SCREW FITTING

Carl J. Rasmussen, Seattle, Wash.

Application August 24, 1943, Serial No. 499,781

1 Claim. (Cl. 285—6.5)

This invention relates to screw fittings and more particularly to threaded means for sealing the passage of insulated cables through walls.

Among the objects of the invention is to provide a fitting for passing a cable through a wall, that can be quickly and easily applied to the wall.

Another object is to provide such a fitting that is water tight with respect to the wall and the cable.

Another object is to provide a fitting adaptable to thick or thin walls.

A further object is the protection of the insulation on electric cable while being drawn through the hole in the wall.

Other objects and advantages will appear as the description proceeds.

In the specification and drawing the invention is disclosed in its preferred form. But it is to be understood that it is not limited to this form, because it may be embodied in modifications within the spirit of the invention as defined in the claims following the description.

In the one sheet of drawings:

Fig. 1 is a side elevation in partial vertical section showing the various parts in their relative positions before assembly.

Fig. 2 is a similar view of the same in assembled condition.

In detail the structure illustrated in Fig. 2, comprises the bulk-head wall X, through which a suitable hole X' has been burned or drilled.

The gasket 2 is placed on the bushing against the hexagonal head 3 and bears against the wall X when the bushing is pushed through the unthreaded hole X'. A similar gasket 4 is then placed on the protruding bushing and bears against the opposite side of the wall. The internally threaded hexagonal sleeve 5 is then screwed onto the bushing and turned up tightly to compress the gaskets 2, 4, forming a water tight joint with the wall X.

The flexible cable Y is then passed through the bushing 1 and the sleeve 5. The outer end of the hole through the bushing 1 should be chamfered to prevent injury to the insulation on the cable Y. The tapered seat 6 of the stuffing box serves the same function in protecting the cable being pulled therethrough.

When the cable is in the desired position, the compressible packing 7 is inserted, followed by the gland ring 8, and the gland 9 having the hexagonal head 10. The gland is screwed into the sleeve 5 until the packing 7 is compressed and seals against the perimeter of the cable insulation to form a water tight joint and resist longitudinal movement of the cable through the assembled fitting. Should the cable be displaced longitudinally the packing 7 would still function.

It has been the practice heretofore to drill and tap the heavier plates such as X, and screw bushings, such as 1 thereinto. A needlessly expensive and tedious operation, often in practically inaccessible positions for the use of the necessary tools.

By the use of the present invention, the hole X' is not threaded and may even be a rough hole made with a burning torch, not necessarily perfectly round nor more than roughly finished to seat the conforming gaskets 2, 4. Until the cable Y is in proper position, the gland ring 8 and the gland 9, merely ride on the cable until the packing 7 is inserted, after which the assembly is completed as described.

Except in extreme pressure conditions one gasket such as 2, or 4 suffices. Under dry conditions no gaskets are required. The gasket seal may be replaced with a suitable pipe joint compound.

Having fully described this invention and its mode of operation what is claimed and desired to secure by Letters Patent is:

In combination with a wall having a hole therethrough; a threaded bushing having a head thereon and projecting through said hole; a gasket interposed between said head and wall; a sleeve threaded on said bushing abutting said wall and having an internal packing seat; a gland threaded in said sleeve; a gland ring within said sleeve between said seat and the end of said gland; and a packing interposed between said seat and gland ring.

CARL J. RASMUSSEN.